July 13, 1965

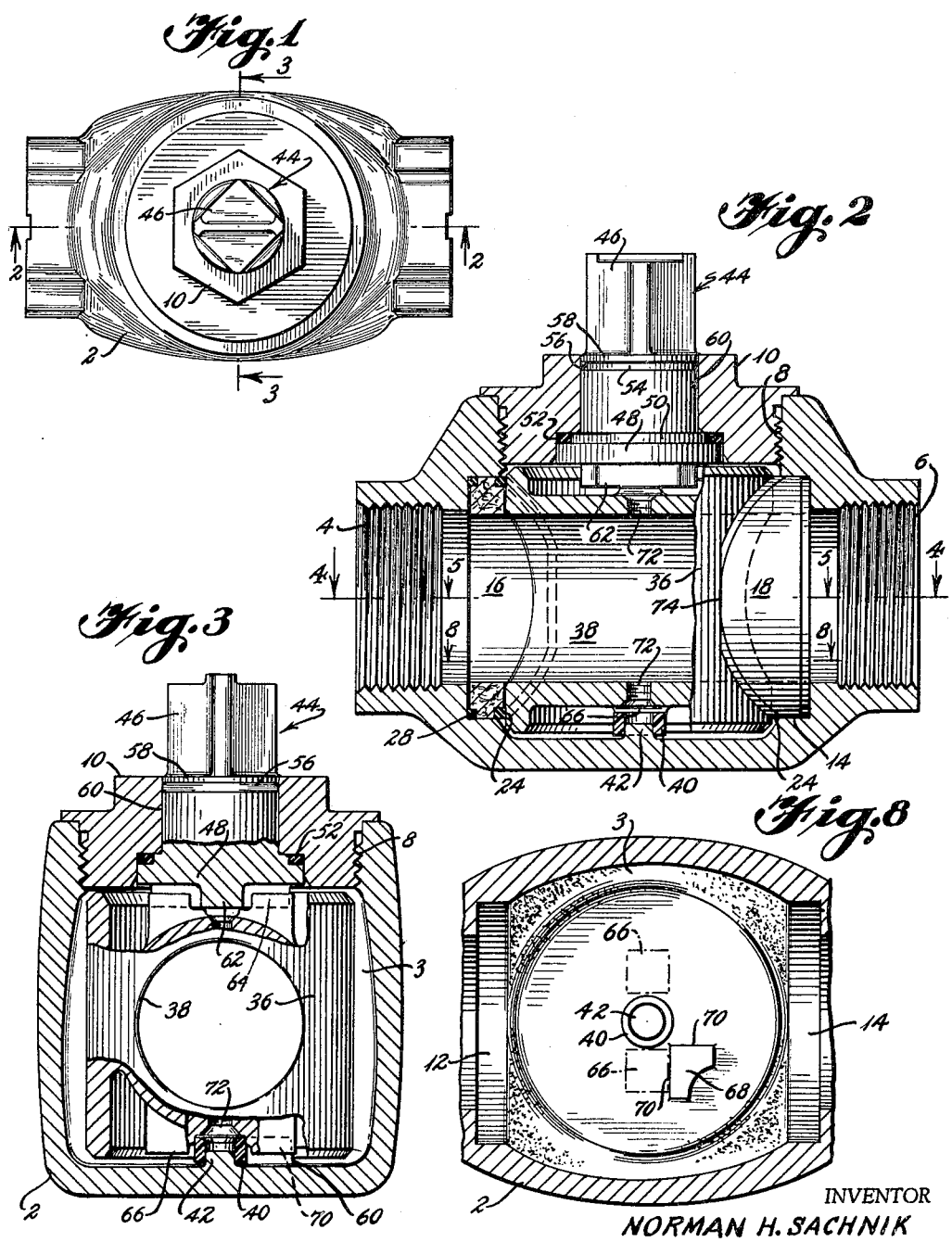

N. H. SACHNIK 3,194,534

BALANCED STEMLESS ROTARY PLUG VALVE AND
SEALING STRUCTURE THEREFOR

Filed Jan. 8, 1964

INVENTOR
NORMAN H. SACHNIK

BY Norman Aon Witt
ATTORNEY

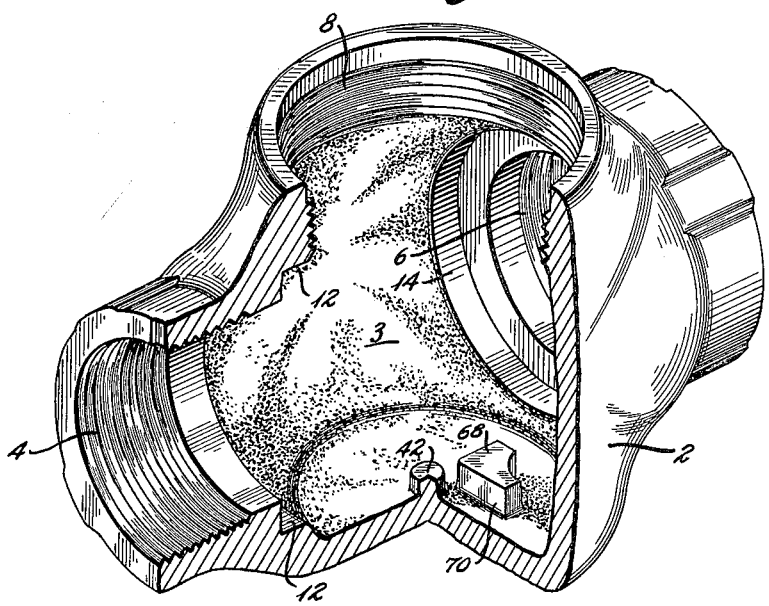
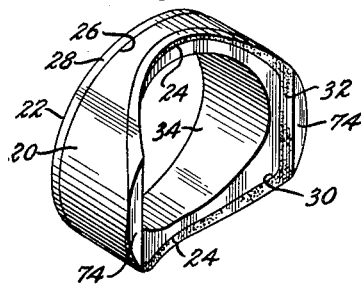
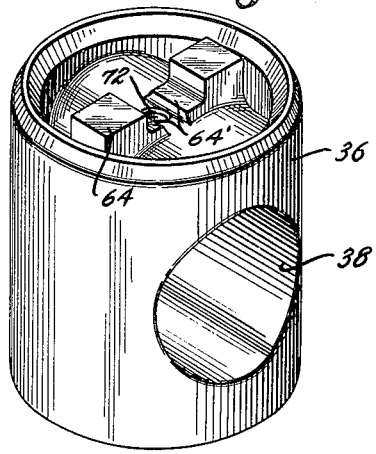
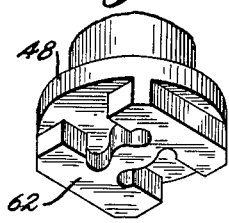
INVENTOR
NORMAN H. SACHNIK

United States Patent Office 3,194,534
Patented July 13, 1965

3,194,534
BALANCED STEMLESS ROTARY PLUG VALVE
AND SEALING STRUCTURE THEREFOR
Norman H. Sachnik, Houston, Tex., assignor to
Texsteam Corporation
Filed Jan. 8, 1964, Ser. No. 336,423
8 Claims. (Cl. 251—175)

The present application is a continuation-in-part of and merges two U.S. applications, Serial No. 71,668 and Serial No. 71,556 which were concurrently filed on November 25, 1960, by Norman H. Sachnik. Those applications disclosed what applicant believed at that time to comprise two separate but closely related inventions on his improved rotary plug valve structure.

The invention of this application therefore relates to and combines the disclosed valve of the rotary plug type, its housing and particularly the independent or stemless valve member of simplified construction with novel mounting and seal means freely within a bulbous chamber of the valve housing to which the claims are directed.

Valves such as plug valves and globe valve assemblies have long been popular because of their relatively simple and generally reliable construction for controlling the flow of fluids. As these valves have been applied to systems handling higher pressure fluids, various sealing problems have developed. Further, under present practices and methods, combined with the required construction means and labor costs for grinding and machining operations make such prior constructions relatively expensive to produce and service. This invention, however, relates to an improved valve structure which deals with all such problems.

The object of this invention therefore is to provide a similar but different structure which can be produced mainly by the use of castings requiring a minimum of handling and machining operations and in which the sealing at the interfaces of the relatively moveable parts is dependable, long lasting and more easily manufactured, assembled and the parts replaced when worn.

It is a further object of this invention to provide a combined plug valve mounting and sealing means between relatively moveable curved surfaces, each of which has an opening therein.

It is a further object of the invention to provide a rotary plug valve structure in which the sealing and plug mounting means therein is always responsive to the fluid pressure in the system and is in such balanced relation as to improve the operation thereof and perfect the operation and maintenance of the sealing means.

These and other objects will appear from the following description when read in conjunction with the attached drawings wherein:

FIG. 1 shows a plan view of the operating end of the valve of this invention;

FIG. 2 is a section taken on the line 2—2 of FIG. 1;

FIG. 3 is a section taken on the line 3—3 of FIG. 1, and normal to the section of FIG. 2;

FIG. 8 is a view partly in section taken along the line 8—8 of FIG. 2 with the plug valve and seals removed to show the inner bottom wall of the housing. The pair of spaced lugs formed on opposite ends of the removed plug valve are here shown in dotted lines with relation to a stop member which is upstanding from the bottom wall;

FIG. 9 is a cut-away view showing the valve housing or casting partly in section;

FIG. 10 shows a removable and telescopic valve seat member of which there are two;

FIG. 11 shows the cylindrical plug-type valve element all parts of which are duplicated at opposite ends for ease of assembly; and FIG. 12 shows the separable coupling or key end including the connected portion of the valve stem.

Figure 4:
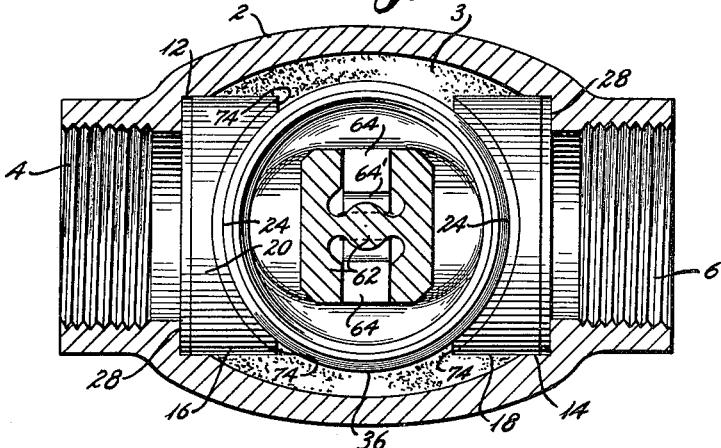
FIG. 4 is a section taken horizontally through the valve housing and showing the plug valve and its opposed supporting valve seat members in full lines.

The casting housing shown best in FIG. 9 and designated generally as 2 is provided with a central bulbous chamber 3 and opposed threaded side port extensions 4 and 6 for connection to inlet and outlet conduits of a fluid pressure system (not shown). A top end threaded bore-type extended open portion 8 also communicates with the top of the central chamber for the assembly of the plug valve and valve seats therethrough and the threads of that opening 8 are adapted to receive the externally threaded and centrally bored valve stem retaining and closure member 10. The threaded opposed side port portions 4 and 6 and the intermediate chamber 3 define the transverse passageway for the passage and control of fluid through the housing 2, by the valve member later described. This casting housing 2 is machined only to provide the threads at 4, 6 and 8 and the cylindrical surfaces 12 and 14 for slidably supporting the valve seat bodies 16 and 18 respectively, within the ports 4 and 6 and later to be described in detail.

Each valve seat member is formed with a relatively hard and smooth cylindrical body having an outer surface portion 20 for sliding engagement within a cylindrical surface 12 or 14. One end of each said valve body 22 is flat and the other end is formed with a cylindrical surface 24. See FIG. 10. The outer boundary of the cylindrical surface 20 with the flat outer end surface 22 of each seat member is stepped or recessed circumferentially as at 26 to form an annular seat for a resilient seal ring 28 which is bonded to the body of the seat, and extends slightly both radially and axially beyond surfaces 20 and 22 respectively. It will also be noted that at the inner end and boundary of the cylindrical surface 20 which projects into the bulbous chamber 3 of the housing 2 and provides the cylindrical inner end surface 24 is similarly stepped or recessed as at 30 to form a seat for a resilient seal ring 32, which is also bonded to the seat body and extends outwardly radially and axially a sufficient distance such that in the operative position of valve and seat only the seal ring contacts the valve. A cylindrical opening 34 is formed in the body of each valve seat member concentric with the surrounding surface 20 to provide a passageway for the fluid through the valve seat.

The valve seat body may be molded from any one of a rather large selection of fibrous or filament materials, such as plastics, nylon or glass filler compounds, which are cemented together in a thermal setting plastic to form an integral mass. Depending upon the nature of the use to which the valve will be put, the valve seat members may also be formed of metal.

These resilient seal rings 28, 32 are preferably made of a low-friction and wear-resistant plastic such as nylon, tetrafluoroethylene materials (one such being Teflon, a trademark of the Dupont Company) thermo-setting materials or rubber-plastic mixes.

Between these telescopically mounted valve seats 20 just described is mounted a truly cylindrical valve member 36 having a transverse port 38. As will be noted by reference to FIGS. 3 and 11 particularly, this plug valve member 36 is constructed the same both top and bottom as shown, to facilitate its assembly within the housing 2. The pair of lugs, later referred to as 64–66 which are similarly formed on opposite ends of this plug valve are to assist in its initial placement within the bulbous chamber of the casting housing and to provide means whereby the valve plug is permitted certain freedom of movements particularly during operations limited primarily by the closely fitting telescopic valve seat members. The valve member being freely supported to move slightly laterally as well as rotatively, may be rotated from the open position shown in FIG. 5 for the free flow of fluid to the closed position of FIG. 7 where the flow of fluid is stopped or to the position of FIG. 6 where the flow is throttled from a key member extending outside the closure 10 of the chamber as will be later described. A nylon ring 40 mounted on a boss 42 on the inner base of the housing serves to initially support the valve member with its transverse port aligned with the fluid transmitting passages 4, 6 and 34 for rotation and slight lateral shifting movement as will be understood.

As is shown clearly in FIG. 2 an operating stem 44 is rotatably mounted about a fixed axis in retaining member 10 and has formed integral therewith at its outer end a head 46 of square shape which may be engaged by a wrench or other suitable tool for rotating it and at the other or inner end is formed with an annular flange 48 stepped at 50 to provide an annular shoulder and space relative to the retaining member 10 in which a rotary sealing member in the form of an O-ring 52, is positioned. Similarly a neck portion 54 of the stem houses a rotary top packing 56 and is protected by the stem flange 58 which covers the bore 60 of the retaining member 10.

An H-shaped key 62 is employed at the inner end of the stem 44 and is adapted to closely intermesh or rather straddle with the pair of spaced apart lugs 64, formed on the top end of the separate and freely supported cylindrical valve member 36. In this manner an effective but simple operating connection between this rotatively mounted stem 44 and the freely movable valve member is achieved, which will enable the valve to be desirably rotated and at the same time permit the valve member 36 to shift slightly laterally relative thereto as required under changes in fluid pressure condition thereon within the enlarged chamber 3.

As both top and bottom ends of the cylindrical valve member 36 of FIG. 11, are alike the bottom surface of the valve is likewise provided with a pair of lugs 66 which as shown are square in cross section and disposed on opposite sides of vertical center of the valve member. Therefore, in cooperative relation with said lugs the opposed bottom wall of the housing chamber 3 is supplied with an upstanding boss 68, having flat right angularly disposed surfaces 70 for engagement with the lugs 66 when the valve member is rotated. That is to say when the valve member is rotated to the complete open position as shown in FIG. 5 one lug 66 cooperates with a flat face 70 of the boss 68 to limit the rotation of the valve and when the valve member is rotated to the complete closed position as shown in FIG. 7 the other lug 66 will cooperate with the other face 70 to limit rotation of the valve member in that closing direction.

It is important to note that the valve member 36 is formed with one or more threaded openings 72, see FIG. 2, which in assembled condition of use serve to equalize pressures inside and outside of the valve member 36, its two supporting valve seats 16–18 and the bulbous chamber 3 of the valve housing 2, thus guarding against excessive pressure being lodged solely within the valve body. The apertures 72 provide a means for safely balancing such pressure on opposite sides of the valve member and its telescopic valve seats in use and also eliminating the danger of such pressure being confined within the valve member assembly in disassembly of such parts. The threading of these apertures provides a means for fastening a thread assembly tool which can be threaded into either aperture of the valve member to facilitate assembly and disassembly as will be readily understood. Both openings are thus threaded since the valve member is symmetrical about a central vertical plane, hence the member can be inserted into the valve housing chamber with either end up or down.

Figure 5:
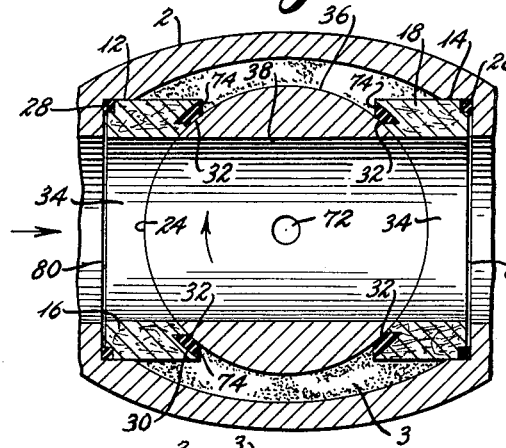
FIG. 5 is a section taken on the line 5—5 of FIG. 2.
Figure 6:
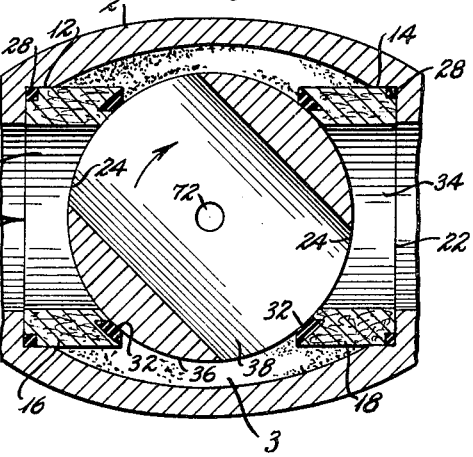
FIG. 6 is a view similar to FIG. 5 showing the valve rotated into a partially closed position.
Figure 7:
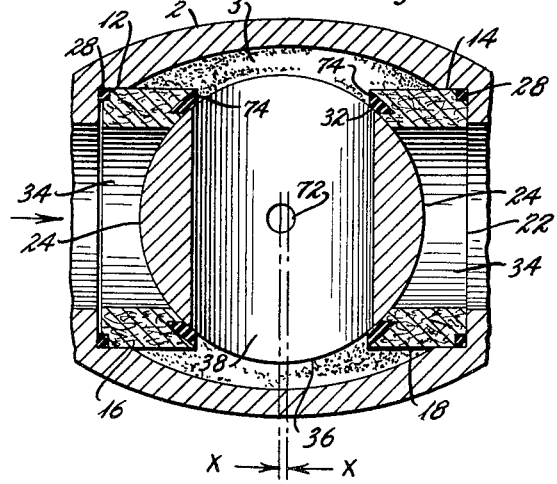
FIG. 7 is a view similar to FIG. 5 showing the valve rotated to closed position.

Now with respect to the showings in FIGS. 5, 6 and 7 in use particularly, attention will first be directed to FIG. 5 in which the upstream fluid pressure enters or develops from the inlet side or port 4 and thence through both valve seat members 34 and the wide open registering transversely port 38 in the centrally supported plug valve member 36 and through outlet port 6. Actually in the closed system in use intended to be represented here the fluid pressure throughout this valve assembly, including the unmachined inner spaced walls of the bulbous chamber 3, of the valve housing 2, will be substantially uniform, because of the pressure balancing openings at 72 in one or both ends of the freely mounted plug valve member 36. That is to say, the fluid pressure in the valved pipe system is actively engaging all sealing elements within the housing 2 including those at the outer ends of the telescopic valve seats 20 and 20' in a more or less balanced condition. This condition remains substantially the same throughout the major rotation of the plug valve member 36, as shown in FIG. 6, except that here the enlarged chamber space 3, is directly subjected to the fluid pressure of the system as the larger transverse port 38 in the plug valve is rotated toward the closed position of FIG. 7. In this latter shown closed position of the plug valve the upstream fluid pressure is exerted on the left of the figure, which operates to shift the valve member and seats to the right and to compress the seals to thereby from a more efficient seal. The seal shown at the left of the figure is radially expanded by the fluid pressure into stronger sealing engagement with the adjacent surfaces. The shifting of the parts to provide for a more efficient sealing allows the manufacture of the device in which the machining of the rough casting is limited to the portions for mounting the seats. That is, only surfaces 12, 14, 80, 82 require machining, in addition to forming the threaded portions, and the tolerances can be quite large as above explained.

Assuming that the valve housing member 2 of FIG. 5 is as shown in that figure with no fluid pressure applied, the valve member 36 is urged to the center position by the resilience of the seals 28 and away from the valve member 36 by the resilience of seals 32 as indicated by the vertical dot and dash lines x—x in FIG. 7.

The placement of the seals at the intersections of surfaces 20, 22 and 20, 24 allows the balancing fluid pressure to act to distort the seals into more forceful engagement with the surface to be sealed. For example, pressure exerted radially on seal 28 will urge the seal into forceful engagement with surface 12 (or 14) and consequently with surface 80 (or 82). Pressure on seals 32 urges the seals into more forceful engagement with the valve member. In order to prevent this pressure from forcing the seals into opening 38 where they will be sheared by the edge of the opening on rotation of the valve member, I have found that these side edge portions of the seals should be formed as shown at 74 in FIG. 10, hence these side portions of these seals are cut away to provide the flattened portions 74 in a plane parallel to surface 22.

What I claim is:

1. A valve seat for a cylindrical valve comprising a body member having an outer cylindrical surface, a cylindrical opening through said member concentric with said outer surface for flow of fluid therethrough, a concave cylindrical surface at one end of said body intersecting said outer cylindrical surface, a continuous groove formed in said body member at the intersection of said surfaces, and a flexible sealing ring bonded in said groove and extending axially outwardly therefrom except on diametrically opposite sides thereof which are flattened and extend normal to said outer cylindrical surface whereby eliminating galling engagement of said sealing ring with an edge of a transverse opening in a plug valve when rotatively supported thereby.

2. A device as in claim 1 wherein the other end of the body is defined by a plane radial surface intersecting the cylindrical outer surface, a continuous groove formed at said intersecting surfaces, and a flexible seal ring bonded in said groove.

3. A device as in claim 2 wherein the cross-section of the sealing ring is rectangular.

4. In a plug valve, a valve comprising a housing having a chamber therein, a passageway through the housing and chamber for the flow of fluid therethrough, a valve element shiftably and rotatably mounted in said chamber in the housing for opening and closing the passageway, yieldable telescopic valve seat members in the housing and extending into said chamber for yieldably supporting opposite sides of the valve element for movement both parallel and normal to the axis of rotation of said valve element, and like means on opposite ends of said valve element to function as rotating and stop means respectively, whereby to limit rotation of the valve element in one direction to open said passageway, and in the opposite direction whereby the passageway is closed.

5. A device as in claim 4 wherein the stop means also comprises a lug integral with the housing and extending into said chamber, and a pair of lugs integral with the valve element for engagement with said stop means.

6. A device as in claim 5 wherein the lug integral with the housing is provided with a pair of flat faces at right angles to each other.

7. In a plug valve, a housing having aligned generally cylindrical inlet and outlet ports in the side walls thereof, a plug valve chamber therebetween having its vertical axis normal to the axes of said ports, said ports being axially stepped to provide in each an annular base shoulder and a cylindrical wall extending inwardly therefrom and adjoining said valve chamber, and like generally tubular valve seat members slidably mounted in said cylindrical walls of said ports; the improvement comprising said tubular valve seat members being sealed against said base shoulders at one end thereof and having their opposite end face portions concaved and protruding into said valve chamber, the protruding arcuate top and bottom outer edge portions of said concaved face portions being recessed and uniformly stepped therealong and adjoin recessed and irregularly stepped and widened continuations thereof at opposite side edges of said face portions, a similarly shaped resilient sealing ring of greater thickness than said stepped edge portions bonded therein to surround each of said inlet and outlet ports in said valve chamber, a cylindrical plug valve having a transverse port therethrough freely positioned within said chamber between said opposed concaved face portions of said tubular seat members and resiliently supported for rotation by said opposed resilient sealing rings on said face portions, means carried by said housing and engaging said valve to rotate same while thus supported, and said sealing ring having the opposite side edge portions thereof angled away from said valve surface, whereby the leading edges of said resilient sealing rings will pass freely over the port in said valve on rotation thereof without shearing and galling action thereof.

8. In a rotary plug valve having a transverse opening therethrough,
(a) a unitary valve housing having a central bore and opening through one side of said housing, said housing also having opposed stepped inlet and outlet ports communicating with opposite sides of said bore,
(b) a tubular plug valve member mounted for lateral movement wholly within the bore of said housing and in spaced relation to the walls thereof, and having a key at one end thereof,
(c) cylindrical valve seat members slidably mounted in said stepped ports and yieldably engaging and sealing with opposite sides of said plug valve member in said bore to center and support same within said housing and having
   (1) a straight face with a step formed in the periphery of one end thereof and having a flexible ring disposed within said step for sealingly engaging said valve body;
   (2) a concave face in the opposed end having a flexible lip formed integral with the peripheral edges of said concave face, said flexible lip being peripherally interrupted and flattened at diametrically opposite sides thereon to provide flat sealing areas extending normal to said transverse opening through said plug valve;
(d) a plug valve retaining member removably secured in the opening through one side of said housing and having an opening therethrough,
(e) a stem member rotatably mounted in the opening in said retaining member and having
   (1) an operating head at one end of said stem exterior of said housing;
   (2) a key formed at the opposite end of said stem and mateable with the key end of said plug member within the bore of said housing to effect rotation of said plug member between the yieldable valve seat members when said stem is rotated by said head;
(f) said plug member having a transverse port therethrough for alignment with said inlet and outlet ports through said yieldable valve seat members in maintaining a seal between said plug member and said ports during both rotary and lateral movements of said plug member during changes in fluid pressure therein and within said housing;
(g) and tap means in said tubular plug valve member providing communication between the interior and exterior thereof to balance pressure changes on said rotary plug member and valve seats within said housing in maintaining a seal therebetween on rotation of the plug between open and closed positions thereof.

References Cited by the Examiner
UNITED STATES PATENTS

| | | | |
|---|---|---|---|
| 690,232 | 12/01 | Chappell | 251—283 |
| 2,039,220 | 4/36 | Heggem | 251—286 X |
| 2,247,296 | 6/41 | Holtam | 251—286 X |
| 2,511,477 | 6/50 | Mueller | 251—286 X |
| 2,578,396 | 12/51 | Brown | 251—317 |
| 2,628,809 | 2/53 | Mikeska | 251—317 |
| 2,868,497 | 1/59 | Graham | 251—317 X |
| 2,886,282 | 5/59 | Miller | 251—317 X |
| 2,944,566 | 7/60 | Modrin | 251—317 X |
| 2,977,987 | 4/61 | Maynard | 251—172 X |
| 2,986,374 | 5/61 | Rakus | 251—317 |
| 3,011,757 | 12/61 | Miller | 251—172 X |

ISADOR WEIL, *Primary Examiner.*

CLARENCE R. GORDON, *Examiner.*